United States Patent [19]
Albert et al.

[11] Patent Number: 5,907,801
[45] Date of Patent: May 25, 1999

[54] APPARATUS AND METHOD FOR OPTIMIZING WIRELESS FINANCIAL TRANSACTIONS

[75] Inventors: Herb H. Albert, Bellevue, Wash.; Paul A. Renton, Sheridan, Oreg.; Stephen R. Schramke, Seattle, Wash.

[73] Assignee: AT&T Wireless Services, Inc., Kirkland, Wash.

[21] Appl. No.: 08/532,079

[22] Filed: Sep. 22, 1995

[51] Int. Cl.⁶ .......................... H04M 15/00; H04M 11/00
[52] U.S. Cl. ................. 455/406; 379/91.01; 340/825.33
[58] Field of Search ................................. 455/406–409, 455/403, 466, 557; 379/91.01, 93.01, 93.05, 93.06, 93.08, 93.12, 90.01; 340/825.33, 825.34, 825.31; 395/218, 216, 242–244, 235, 226; 370/477, 465, 466

[56] References Cited

U.S. PATENT DOCUMENTS

| | | | |
|---|---|---|---|
| 3,798,602 | 3/1974 | Hynes, Jr. | 340/825.33 |
| 3,892,948 | 7/1975 | Constable | 340/825.33 |
| 4,393,502 | 7/1983 | Tanaka et al. | 371/37.4 |
| 4,665,396 | 5/1987 | Dieleman | 340/825.34 |
| 4,707,592 | 11/1987 | Ware | 379/91.01 |
| 4,754,428 | 6/1988 | Schultz et al. | 395/200.96 |
| 4,926,325 | 5/1990 | Benton et al. | 340/825.33 |
| 5,231,570 | 7/1993 | Lee | 340/825.33 |
| 5,276,444 | 1/1994 | McNair | 340/825.33 |
| 5,357,563 | 10/1994 | Hamilton et al. | 379/91.01 |
| 5,386,458 | 1/1995 | Nair et al. | 379/91.01 |
| 5,408,513 | 4/1995 | Busch, Jr. et al. | 379/91.01 |
| 5,457,680 | 10/1995 | Kamm et al. | 455/466 |
| 5,485,510 | 1/1996 | Colbert | 340/825.33 |
| 5,490,251 | 2/1996 | Clark et al. | 379/91.02 |
| 5,500,890 | 3/1996 | Rogge et al. | 340/825.33 |
| 5,652,783 | 7/1997 | Keba et al. | 455/466 |
| 5,722,066 | 2/1998 | Hu | 455/403 |

*Primary Examiner*—Curtis A. Kuntz
*Assistant Examiner*—Tracy M. Legree

[57] ABSTRACT

Disclosed are methods for optimizing financial transaction processing when a conventional financial transaction processing terminal is used with a wireless transmission system. An adapter is used between the terminal and a wireless modem, such as a CDPD wireless modem. The adapter receives from the terminal a data block from which the adapter recovers the requested type of transaction and relevant information about the transaction, such as a credit card number, transaction amount, etc., and formats all transactions into a common format for transaction processing. The common format includes a check code which may be used to detect changes made to the original data block as received from the terminal. The adapter then compresses the common format for wireless transmission. The goal of the use of the common format and the data compression is to fit the transaction request into a single data packet. A host computer receives the data packet, recovers the compressed common format and de-compresses the compressed common format to recover the common format. The common format may then be converted back to the original data block, as it was received from the terminal. The check code may be used to detect errors in compression, transmission and de-compression of the data block. The host computer processes the requested financial transaction and transmits a reply to the terminal, via the wireless modem and the adapter.

18 Claims, 18 Drawing Sheets

| RECORD TYPE | APPLICATION TYPE | DELIMITER | BANK ID | MERCHANT ID | STORE NUMBER |
|---|---|---|---|---|---|
| 1 BYTE | 1 BYTE | 1 BYTE | 6 BYTES | 12 BYTES | 4 BYTES |
| TERMINAL NUMBER | INDUSTRY CODE | CURRENCY CODE | COUNTRY CODE | ZIP CODE | LANGUAGE CODE |
| 4 BYTES | 2 BYTES | 3 BYTES | 3 BYTES | 9 BYTES | 2 BYTES |
| TIME ZONE | MERCHANT CATEGORY CODE | FLAGS | SEQUENCE NUMBER | | FIELD SEPARATOR (FS) |
| 3 BYTES | 4 BYTES | 1 BYTE | 4 BYTES | | 1 BYTE |
| CARDHOLDER INFORMATION | | FS | CARD NUMBER | FS | AMOUNT | FS |
| 1-32 BYTES | | 1 BYTE | 12-16 BYTES | 1 BYTE | 4-12 BYTES | 1 BYTE |
| EXPIRATION DATE | | TRANSACTION-SPECIFIC INFORMATION | | | CHECK CODE |
| 4 BYTES | | 5-105 BYTES | | | 1 BYTE |

FIGURE 3

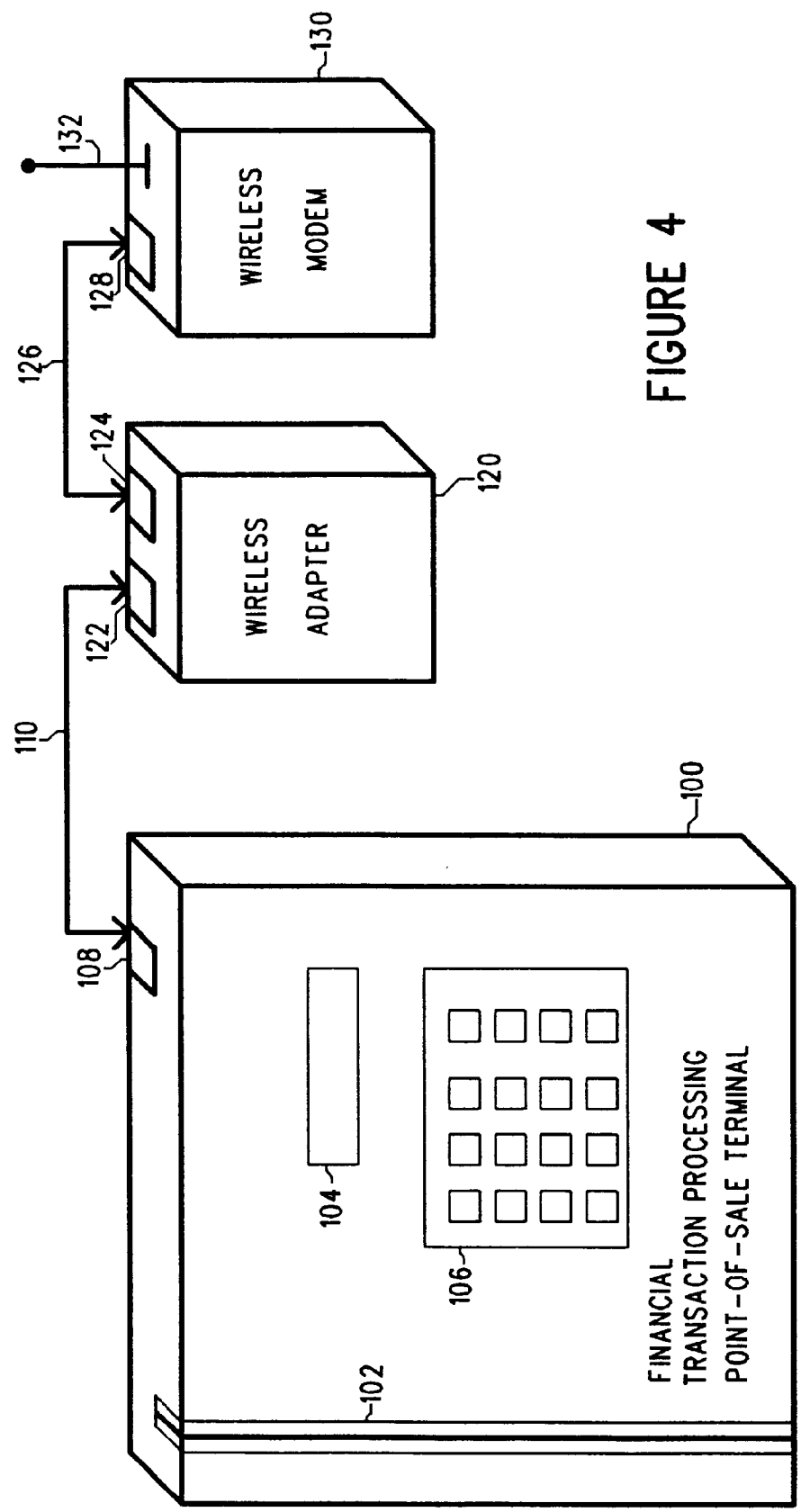

| TRANSACTION TYPE | ADAPTER VERSION | ADAPTER ID | SEQUENCE NUMBER | LENGTH CODE | REQUEST CODE |
|---|---|---|---|---|---|
| CARD NUMBER ||| EXPIRATION DATE || AMOUNT |
| TRANSACTION-SPECIFIC INFORMATION ||| DATA BLOCK CHECK CODE | TRANSMISSION BLOCK CHECK CODE ||

FIGURE 7

| VERSION | HEADER LENGTH | TYPE OF SERVICE | TOTAL LENGTH |
|---|---|---|---|
| DATAGRAM IDENTIFICATION | | FLAGS | FRAGMENT OFFSET |
| TIME TO LIVE | PROTOCOL NUMBER | HEADER CHECKSUM | |
| SOURCE IP ADDRESS | | | |
| DESTINATION IP ADDRESS | | | |

FIGURE 8

| SOURCE PORT NUMBER | DESTINATION PORT NUMBER |
|---|---|
| UDP PACKET LENGTH | UDP CHECKSUM |
| DATA ||

FIGURE 9

APPARATUS AND METHOD FOR OPTIMIZING WIRELESS FINANCIAL TRANSACTIONS

TECHNICAL FIELD

The invention relates to the field of financial transaction processing, and more particularly with financial transactions that are processed over a wireless transmission system.

BACKGROUND OF THE INVENTION

Conventional financial transaction processing methods and systems use a terminal, such as the ubiquitous Tranz 330 terminal manufactured by Verifone Corp., and a dialup telephone line to process financial transactions. A merchant provides the terminal, by entry of data on the keypad of the terminal and/or by running a credit or debit card through a magnetic track reader incorporated in the terminal, with information which describes a requested financial transaction. The terminal then uses the public switched telephone network to establish a connection with a host computer, transmits the information describing the financial transaction, receives a reply from the host computer relating to the requested financial transaction, acknowledges receipt of the reply from the host computer, and terminates the connection with the host computer. The terminal then provides, on its display, an approval or denial code or other relevant information relating to the requested financial transaction.

When the dialup connection is established between the terminal and the host computer, a path is established which allows data to be bi-directionally transmitted between the terminal and the host computer. Charges for dialup telephone access are assessed based on the type of call and the duration of the call. The dialup telephone access is often a "local" call, with no long-distance charges assessed. Some business phone lines, which a merchant might have, provide unlimited local calling, while other business phone lines are on measured service, wherein the duration of local calls is accumulated and used to calculate the phone bill. Occasionally the dialup access is provided via a "1-800" Wide Area Telephone Service (WATS) line, for the use of which the merchant is not directly charged by the phone company which provides the telephone service. Only rarely is the dialup access provided via a long-distance call. The dialup access is often a local call with unlimited service, or a measured-rate local call with a low per/minute billing rate. Thus, the duration of each telephone call to process a financial transaction and the amount of data that is transmitted in processing a financial transaction either do not affect the charges associated with the dialup telephone access or only produce minimal additional costs for the telephone service.

In contrast to local dialup telephone service, wireless telephone services, such as the analog or digital cellular telephone systems, and wireless data services, such as the Cellular Digital Packet Data (CDPD) network, assess charges based on the connection time or number of data packets that are transmitted.

Some attempts have been made to use conventional financial transaction processing systems and methods with analog cellular telephone services. One method involves coupling the audio signals between the financial transaction device and an analog cellular telephone via an acoustic coupler, with the merchant hand-dialing the phone number of the host computer on the cellular telephone keypad. Motorola has manufactured cellular telephones with a built-in telephone jack and circuitry which adapts the cellular telephone so that it may be operated as if it were a land-line telephone, and the financial transaction terminal could be connected to this cellular telephone and used without modification.

However, cellular telephone connections incur significant charges due to the lengthy time of cellular telephone connection establishment and the lengthy time which the connection must be maintained in order to process the financial transaction. The time during which the connection between the terminal and the host computer is being established may be charged for by the cellular carrier, which may result in charges for 10–20 seconds of cellular air-time for each transaction processing request even while no financial transaction processing is actively occurring. Additionally, many cellular carriers charge for connection time on a whole-minute basis, so that a cellular telephone call which had a duration of only 20 seconds may be billed at a rate as if the cellular telephone call lasted for an entire minute. If the cellular telephone call lasts for one minute and one second, the charge for the cellular telephone call may be billed at the rate for two whole minutes.

Simply changing from the analog cellular telephone system to a digital data system, such as the Cellular Digit Packet Data (CDPD) network, does not eliminate the additional charges incurred with a wireless transmission system. Even if the terminal could be made to directly address a CDPD wireless modem to provide a connection to the host computer, transmit the requested financial transaction and receive the response from the host computer, the conventional systems and methods of financial transaction processing would incur significant charges due to the number of data packets which are transmitted by conventional methods. Conventional methods may require packets to establish the connection between the terminal and the host computer and start the transaction process, one or two data packets to transmit the requested financial transaction, a data packet from the host computer to acknowledge receipt of a data packet from the terminal, one or two packets to provide the response for the requested transaction, one data packet to acknowledge receipt of the response from the host computer, and more data packets to close the connection. If there are transmission errors or synchronization errors which require re-transmission of data packets the total number of data packets per requested financial transaction rises further.

Conventional financial transaction processing systems and methods are not efficient when used with wireless transmission systems. What is needed is a method of optimizing financial transactions which are generated by conventional transaction processing equipment for efficient use with wireless transmission systems.

SUMMARY OF THE INVENTION

It is an object of the invention to provide a method for optimizing financial transactions which are generated by a conventional financial transaction processing terminal when used with a wireless transmission system.

It is a further object of the invention to provide a method of optimizing financial transactions in a manner that provides transparency of operation between the terminal and the host computer, so that no changes to the operation of the terminal need to be made in order to use the method of the invention.

A still further object of the invention is to provide a method of detecting and correcting errors in the transparent operation of the method.

Briefly, the invention provides an adapter to be used with a conventional financial transaction processing point-of-sale terminal and a wireless modem. The adapter receives a data block from the terminal indicative of a requested financial transaction. Analysis of the requested financial transaction is performed by the adapter to identify the requested transaction as one of a set of recognized types of financial transactions. The adapter converts each of the recognized types of financial transactions into a single common transmission format. This single transmission data format is designed to allow each of the recognized types of financial transactions to be compressed into an optimized compressed transmission format. After compressing the common transmission format the adapter transmits the compressed data in a data packet to a host computer via the wireless transmission system. The use of the optimized compressed transmission format reduces the number of data packets transmitted via the wireless modem.

Another aspect of the invention comprises methods to reduce the number of data packets transmitted across a wireless transmission system in the processing of financial transactions. The methods are implemented in an adapter which connects to the financial transaction processing terminal and to a wireless modem. The method of the invention allows the data block received from the terminal to be converted to a single common transmission data block, which is then compressed to minimize the number of data packets which are transmitted via the wireless modem when a financial transaction is processed.

The invention further reduces the number of data packets transmitted in processing a financial transaction by using a connectionless protocol for data packet transmission. This protocol may be the User Datagram Protocol (UDP) which is also used with the Internet Protocol (IP). UDP and IP are broadly known and available for use in the fields of data transmission, for both land-line based systems and wireless systems. The methods of the invention include compressing the common transmission data format so that the entire IP datagram, including the IP header, the UDP header and the UDP datagram which contains the compressed transmission format may be transmitted inside a single data packet via the wireless transmission system. Unlike conventional financial transaction processing systems, a connectionless protocol is used. Since no data packets are transmitted to establish a connection prior to the transmission of the data packet containing the requested financial transaction, the invention further reduces the number of data packets required in processing a financial transaction.

Another connectionless protocol which may be used is the Connectionless Network Protocol (CNLP). CNLP is a standard protocol which may be used in place of IP/UDP. Some CDPD wireless modems incorporate operating modes which make CNLP available for use. In this case the use of the connectionless protocol involves setting the CDPD wireless modem into the proper state by the adapter transmitting to the CDPD modem the proper commands to establish its operating mode as CNLP, and then the adapter transmits digital data which the CDPD modem encapsulates into the CNLP protocol.

The invention also provides a method to ensure that errors which occur in the conversion of the data block to the common transmission data format, the compression and decompression of the common transmission format, the transmission of the data packets across the wireless transmission system and the reconversion of the common transmission format to the original data block are detected. When the data block is converted to the common transmission data format, a check code is computed on the data block, and the check code is placed into the common transmission data block. When the common transmission data block is compressed into the compressed transmission data block the check code is included in the compressed data block and in the transmitted data packet. After the transmission of the data packet across the wireless transmission system and the subsequent decompression of the compressed data packet and re-conversion of the common transmission format to the original data block the check code is verified. Thus errors in the transformation of the data block, its transmission or its compression and decompression are detected and may therefore be corrected.

BRIEF DESCRIPTION OF THE DRAWINGS

FIG. 3 shows an example of a data block which is transmitted by a conventional financial transaction processing point-of-sale terminal when requesting validation of a credit card transaction.

FIG. 4 shows a financial transaction processing point-of-sale terminal coupled to a wireless adapter of the invention and a wireless adapter coupled to a wireless modem.

FIG. 7 shows an example of a common transmission data block.

FIG. 8 shows an Internet Protocol (IP) header.

FIG. 9 shows a User Datagram Protocol (UDP) datagram, with a UDP header and data.

DETAILED DESCRIPTION OF THE INVENTION

Figure 1:
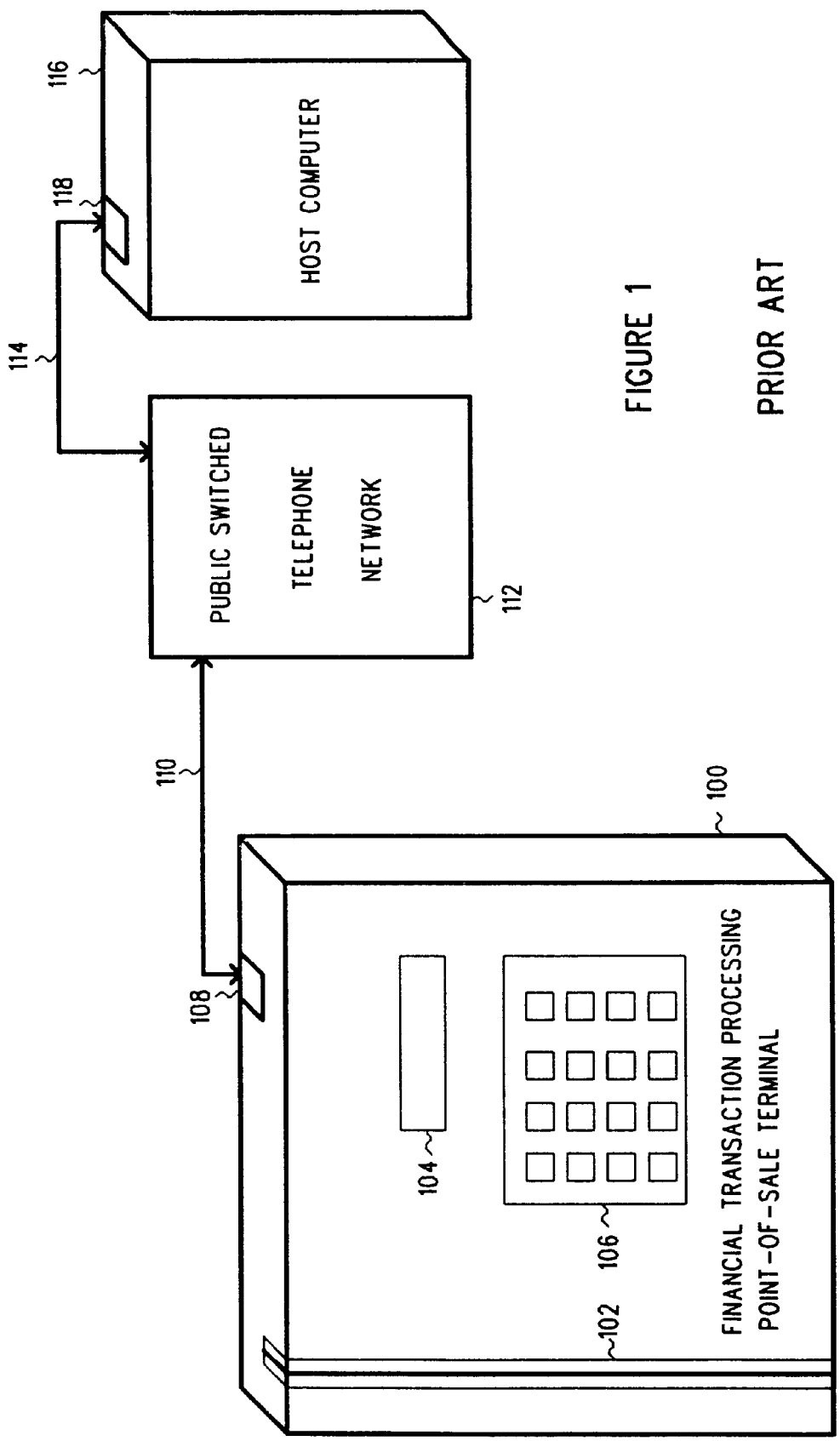
FIG. 1 shows a prior art financial transaction processing point-of-sale terminal connected so as to communicate with a host computer via a public switched telephone network.

In FIG. 1 a conventional system for processing financial transactions is shown. The financial transaction processing point-of-sale terminal 100 communicates with a host computer 116 via a public switched telephone network 112. The terminal 100 has a keypad 106, a display 104, a magnetic card stripe reader 102, and a telephone line connector 108. The terminal 100 has a modem (not shown) which is connected internally to the telephone line connector 108. Some terminals also incorporate an internal printer (not shown).

Figure 2:
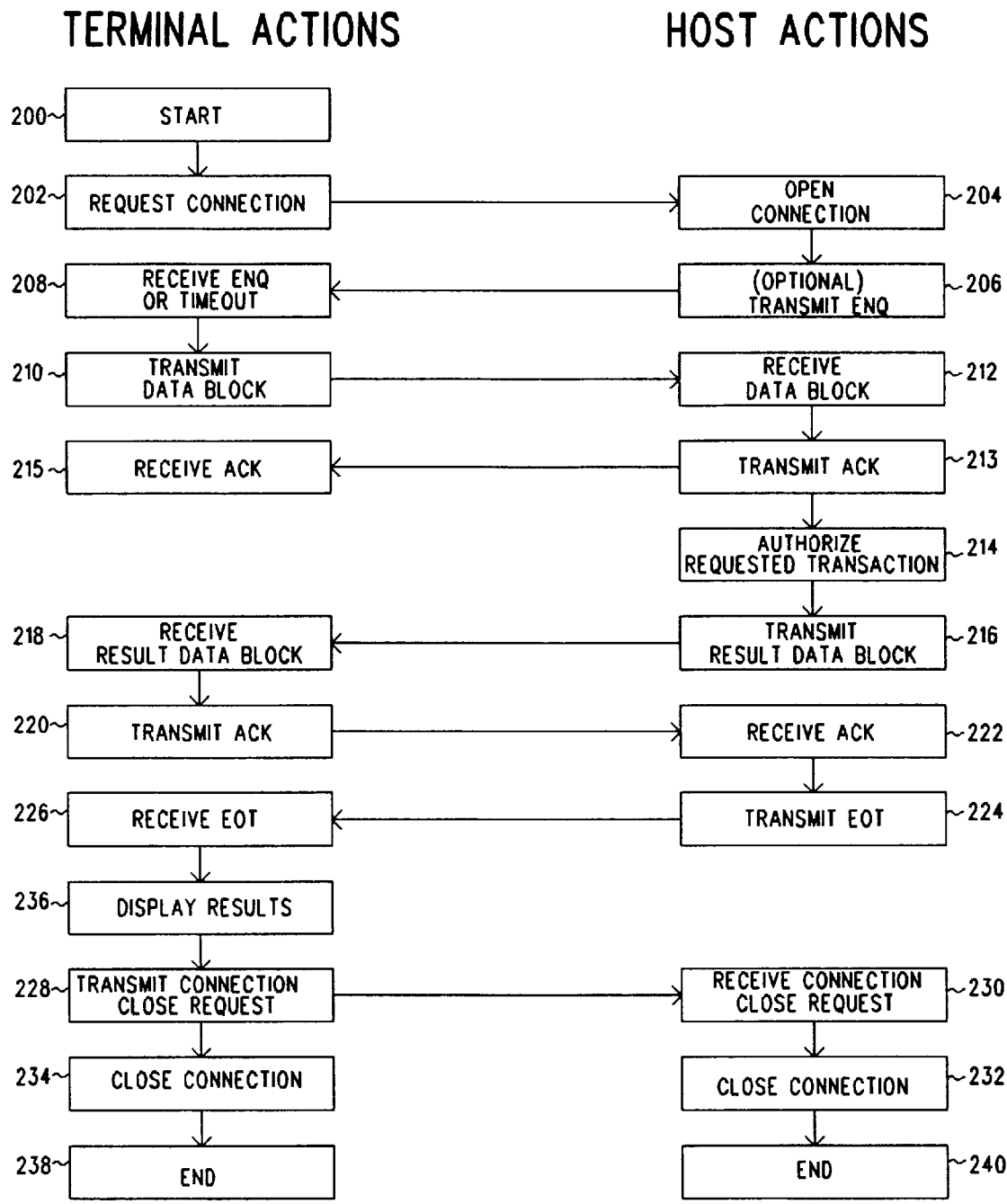
FIG. 2 shows a prior art method of processing a financial transaction, with the transmission of several data packets between the terminal and the host.

FIG. 2 shows the method used in the conventional system for processing financial transactions. At the start of the transaction, step 202, the terminal 100 requests a connection to the host computer 116. When using a public switched telephone network 112 as shown in FIG. 1, the request for he establishment of a connection with the host computer 116 usually consists of the modem (not shown) inside the terminal 100 dialing a specific telephone number via dual-tone multi-frequency dialing. This telephone number is usually a local telephone number, although some financial transactions may be processed using WATS telephone service. The terminal 100 closes a relay to take the telephone line off-hook and seize the telephone line which connects the terminal to the public switched telephone network 112 and then dials a pre-established telephone number. The telephone number dialed by the terminal is that of a modem (not shown) attached to the host computer 116. After the modem at the host computer 116 answers the incoming call a speed and protocol negotiation process is undertaken by the modems at each end of the connection, until a connection is established. The connections of modems via the public switched telephone network 112 is given to be well known in the art.

After the modem connection is established, the host computer 116 usually sends an ENQ (Enquiry, ASCII 5) character in step 204 to the terminal 100. In a preferred embodiment, the ENQ character is transmitted to the terminal 100 by the host computer 116 so that the terminal 100 can sense that the host computer 116 is ready for data. Some terminals may be set to not wait for the reception of the ENQ character prior to the transmission of the data block indicative of the requested financial transaction, and instead may wait a pre-determined amount of time after the establishment of the connection to the host computer 116 and then transmit the data block.

When the ENQ character is received by the terminal, or when the terminal has waited its pre-determined time after the establishment of the connection to the host computer in step 208, the terminal 100 transmits its data block indicative of the requested financial transaction in step 210. An example of a data block transmitted by the terminal 100 to the host computer 116 is shown in FIG. 3.

Turning again to FIG. 2, the host computer 116 receives the data block transmitted by the terminal 100 in step 212. In step 213 the host computer 116 transmits an ACK (Acknowledgment, ASCII 6) character to the terminal 100 to acknowledge receipt of the data block. The terminal 100 receives the ACK from the host computer 116 in step 215.

The host computer 116 then authorizes or denies the requested transaction in step 214. The host computer 116 may communicate with other computers, databases and computing systems (not shown) in order to determine the authorization or denial of the requested transaction in step 214. Once the requested transaction is authorized or denied, the host computer 116 transmits the reply to the terminal 100 via the connection on the public switched telephone network 112 in step 216.

The terminal 100 receives the reply in step 218 and transmits an ACK character to the host computer 116 in step 220 to indicate that the reply was received at the terminal 100.

When the host computer 116 receives the ACK character in step 222 the host computer 116 transmits an EOT (End of Transmission, ASCII 4) character to the terminal 100 in step 224. When the terminal 100 receives the EOT character in step 226 the terminal 100 then displays the result on its display 104, in step 236. The terminal 100 then requests that the connection to the host computer 116 be closed in step 228. When using the public switched telephone network 112 the terminal 100 opens the relay associated with taking the phone line connected to the terminal 100 off-hook to place the terminal 100 back in an on-hook state, which closes the connection to the host computer 116 in step 230.

This completes the conventional processing of a transaction.

Now referring to FIG. 3, an example data block, which may be sent from a terminal 100 when processing a financial transaction, is shown. The data block is transmitted using 7-bit ASCII characters, with even parity, transmitted in a serial format using 7 data bits and an even parity bit.

The first several fields of the data block have fixed lengths. These data fields include information which identifies the type of transaction record, a bank number associated with the merchant, a merchant ID number, a store or location number for the merchant, a terminal ID number, an industry code, information describing the country and location of the terminal, and other identifying information. The first fields also include a sequence number which is used to identify each transaction. Following the fixed-length fields are several variable-length data fields. These fields contain the cardholder information which is read from a magnetic track on a credit card, or which may be entered manually via the terminal keypad 106. Several Field Separator (FS, ASCII 30) characters are shown in the data block. Field Separator characters are used to separate the variable-length fields. A field is provided for the card number, the expiration date, the amount of the transaction and other transaction-specific information. A check code is calculated and inserted into the data frame. This check code is commonly calculated by XORing all of the bytes of the data block together. This check code will detect some simple communications errors, but not errors in the transposition of bytes in the data block.

Fixed-length fields which are not used on a particular transaction still are transmitted as a part of the data block. Many of the first several fields of the data block are identical for each data block transmitted by a specific terminal 100. However, no provision is made in the data block to indicate that a data block has not changed any of these fields since the last data block transmitted. Such a provision would allow a much smaller data block to be transmitted by the terminal, while still allowing transmission of the required data to process the financial transaction.

FIG. 4 shows the terminal 100 connected to a wireless adapter 120 of the invention. The wireless adapter 120 is also connected to a wireless modem 130. The wireless modem 130 may be a Cellular Digital Packet Data (CDPD) modem or other wireless modem. The invention will be described in reference to a preferred embodiment when a CDPD modem is used as the wireless modem 130 with the wireless adapter 120, although those skilled in the art will recognize that another wireless modem may be used with the wireless adapter 120 and methods of the invention. The wireless adapter 120 is shown having a phone line connector 122 and a data transmission interface 124. The wireless modem 130 is shown having a data interface 128 and an antenna 132.

The connection of the terminal 100 to the wireless adapter 120 is provided by a phone line cable 110 which connects to the phone line connector 108 on the terminal 100 and a phone line connector 122 on the wireless adapter 120. The connection of the wireless adapter 120 to the wireless modem 130 is provided by a data cable 126 which connects the data transmission interface 124 of the wireless adapter 120 to the data interface 128 of the wireless modem 130.

Figure 5:
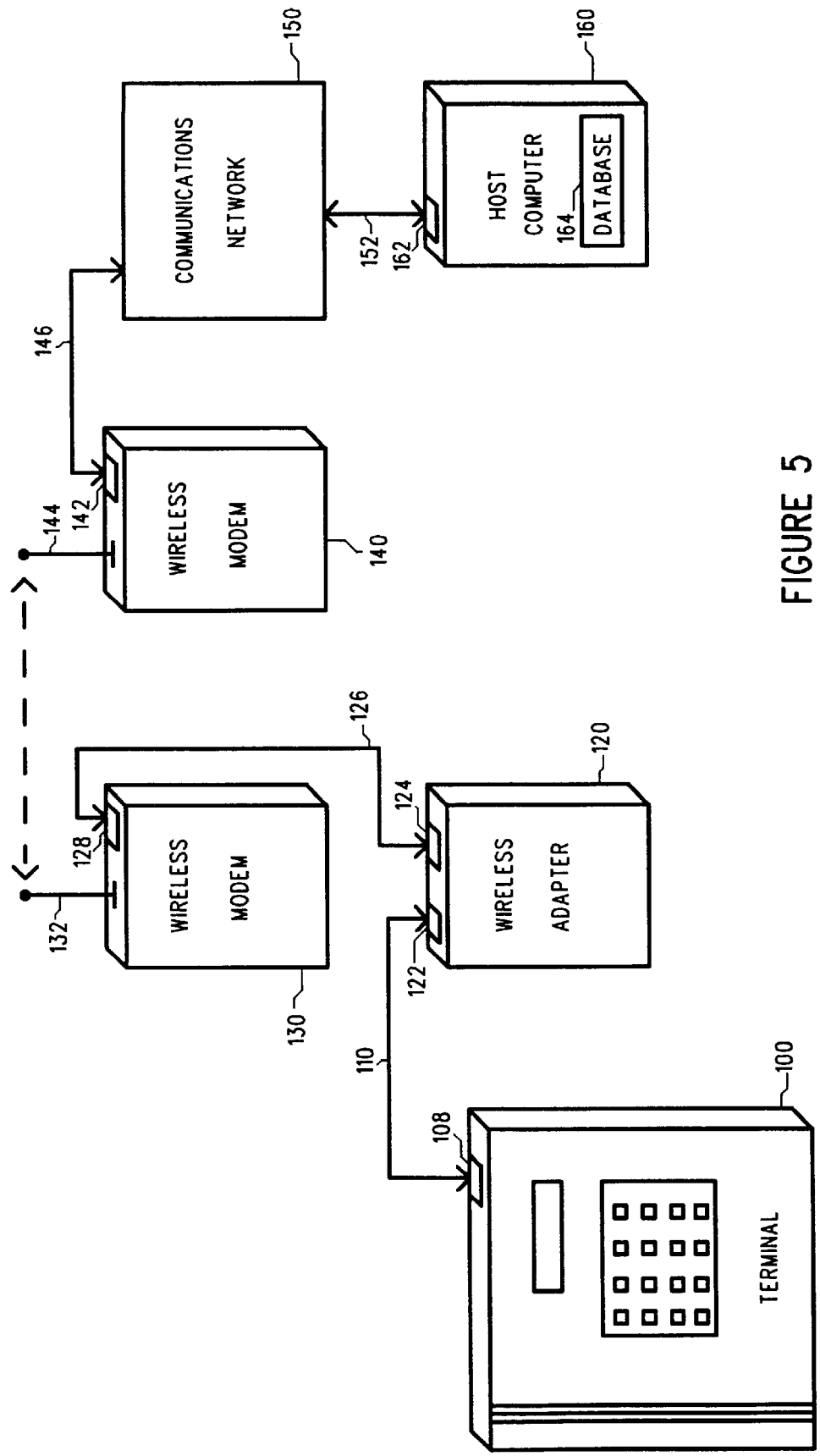
FIG. 5 shows the terminal coupled to a wireless adapter of the invention, a first wireless modem and a second wireless modem coupled to a host computer via a communications network.

In FIG. 5 the wireless adapter 120 is shown connected to the terminal 100 and to a first wireless modem 130. The first wireless modem 130 is shown in communication with a second wireless modem 140. In the case where the wireless modem 130 is a CDPD modem, the second wireless modem 140 is located at a cellular transmission site (not shown) and is a part of the cellular transmission CDPD network (also not shown).

The second wireless modem 140 is connected to a communications network 150. This communications network 150 may be a local area network, a wide area network, a packet switching network or other communications network (all not shown in detail) which may use a public switched telephone system 112 for data transmission. Communications networks are given to be well known in the art and are thus not described in detail herein.

A host computer 160 is also shown connected to the communications network 150. This host computer may be the same host computer 116 as shown in FIG. 1, or host computer 160 may be a different host computer which is used when the terminal 100 communicates with a host computer via the wireless adapter 120 of the invention and a wireless modem 130.

The host computer 160 communicates with the second wireless modem 140 via the communications network 150. Transmissions received by the second wireless modem 140 which are destined for the host computer 160 are transmitted to the host computer 160 by the second wireless modem 140 via the communications network 150, and interconnecting cables 146 and 152. Transmissions made by the host computer 160 which are to be transmitted by the second wireless modem 140 are transmitted by the host computer 160 to the second wireless modem 140 via the communications network 150 and interconnecting cables 146 and 152, and these transmissions are then transmitted by the second wireless modem 140.

The host computer 160 is shown having a database 164 for storage of processing data and status of financial transactions and a connector 162 for connection to the communications network 150.

Figure 6:
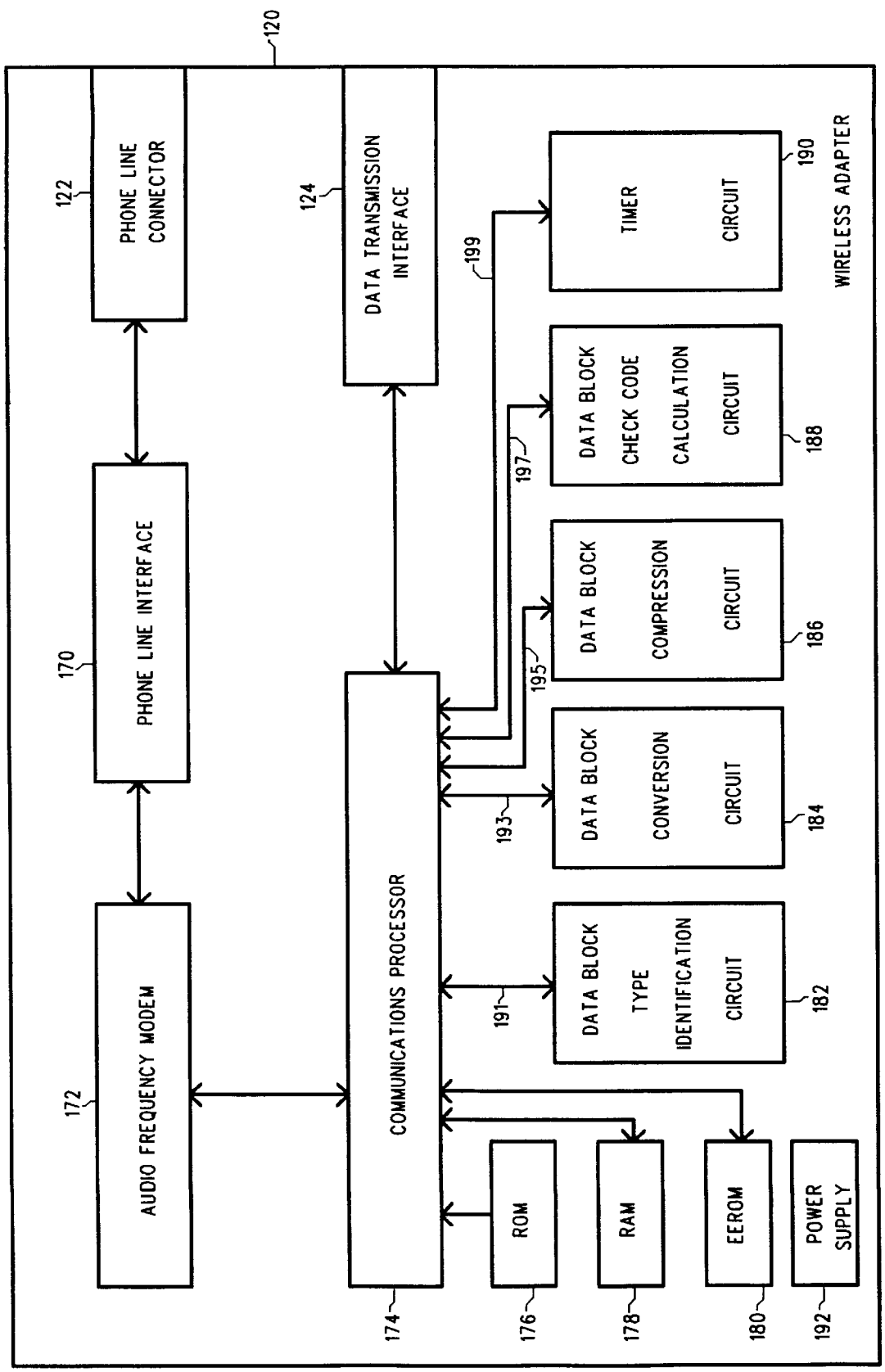
FIG. 6 shows a block diagram of the wireless adapter.

FIG. 6 shows the wireless adapter 120 in detail. A phone line connector 122 is provided for connection to the terminal 100. A phone line interface 170 provides loop current and two-to-four wire conversion for the phone line to the terminal 100. The adapter 120 has an audio frequency modem 172 which is used to establish a modem connection with the modem inside the terminal 100, via the phone line interface 170 and the phone line connector 122 of the adapter 120 and the phone line connector 108 of the terminal 100.

The audio frequency modem 172 is coupled to a communications processor 174. The communications processor 174 is coupled to a ROM 176, a RAM 178, and an EEROM 180. The ROM 176 is for program storage, the RAM 178 is for data storage and data processing, and the EEROM 180 is for storage of configuration settings and parameters. Those skilled in the art will recognize that Flash ROM or other EEROM may be used in the place of the ROM 176. The communications processor 174 may be a type 80186, manufactured by Intel Corporation, or other type of microprocessor or microcontroller. The ROM 176 may be a type 27C256, as manufactured by various manufacturers. The RAM 178 may be a type 43256 as manufactured by NEC Corporation. The EEROM 180 may be a type 29EE010 as manufactured by Silicon Storage Technologies, Inc., or by another manufacturer.

The communications processor 174 is coupled to a data transmission interface 124. Typically the data transmission interface 124 will be a serial port and a serial port connector of the type commonly referred to as a male DB9 connector with a DTE configuration. Data transmission interfaces of this type are given to be well known in the art and are not described in detail herein. It should be noted that some microcontrollers or microprocessors may contain a communications processor 174 and also may contain one or more serial ports which may be used as part of the data transmission interface 124 of the wireless adapter.

The wireless adapter 120 contains a timer circuit 190 which is coupled to the communications processor 174 by bus 199. As with the serial port of the data transmission interface, the timer 190 may be provided as a part of a microcontroller or microprocessor, rather than as a separate circuit.

The adapter 120 contains a data block type identification circuit 182 which is coupled to the communications processor 174 by bus 191. This circuit may be constructed using a memory circuit which is loaded by the communications processor 174 and a fixed set of logic gates which output signals indicative of "matches" to particular data block types. However, the best method of providing the data block type identification circuit is to provide the communications processor 174 with stored instructions in the ROM 176 which cause the communications processor 174 to perform logical operations on a data block stored in RAM 178 to identify the data block type.

The adapter 120 contains a data block conversion circuit 184 which is coupled to the communications processor 174 by bus 193. This circuit is used to convert the data block from a known, identified type into a common data block type for transmission. This circuit may be constructed using a first memory circuit, addressing logic, operating logic and a second memory circuit. The addressing logic operates such as to read data from pre-determined locations in the first memory circuit and place the data read into pre-determined locations in the second memory circuit, while the operating logic performs operations on the data read from the first memory to re-format the data read from the first memory circuit prior to the writing of the data into the second memory circuit. However, the best method of providing the data block conversion circuit is to provide the communications processor 174 with stored instructions in the ROM 176 which cause the communications processor 174 to perform logical operations on a data block stored in RAM 178 to convert the data block.

The adapter 120 also contains a data block compression circuit 186 which is coupled to the communications processor 174 by bus 195. The compression circuit 186 is used to compress a data block which is in the common data transmission block format for transmission. The best method of providing the data block compression circuit 186 is to provide the communications processor 174 with stored instructions in the ROM 176 which cause the communications processor 174 to perform logical operations on a data block stored in RAM 178 to compress the data block. The compression circuit 186 recognizes redundant data or data which does not change from data block to data block and selectively removes the redundant data as part of the compression method. Certain data fields of the common transmission data block will always contain numerical information. The compression circuit 186 may compress the fields which contain numerical information by converting the representation of the numerical data from 8-bit ASCII characters or 4-bit BCD representations into a straight binary representation of the data.

The wireless adapter 120 also contains a data block check code calculation circuit 188 which is coupled to the communications processor 174 by bus 197. The check code calculation circuit 188 may be constructed using shift registers and XOR gates to calculate a Cyclic Redundancy Check (CRC) code in the conventional manner of calculating such codes. Alternatively, the data block check code calculation circuit 188 may be constructed using a stored instruction program in the ROM 176 which causes the communications processor 174 to perform logical operations on a data block stored in RAM 178 to generate a check code.

The wireless adapter 120 contains a power supply circuit 192 for the conversion of input power to the proper voltages for operating the wireless adapter 120.

The communications processor 174 is connected to the data block type identification circuit 182, the data block conversion circuit 184, the data block compression circuit 186, the data block check code calculation circuit 188 and the timer circuit 190 by busses 191, 193, 195, 197 and 199, respectively. These busses may share common signals in the fashion well known in the art.

As shown in FIG. 4, the wireless adapter 120 is coupled to the terminal 100. Referring again to FIG. 6, the communications processor 174 receives a data block from the terminal 100 via the phone line connector 122, the phone line interface 170 and the audio frequency modem 172. The communications processor 174 provides the data block, or a copy thereof, to the data block type identification circuit 182 via the bus 191. The data block type identification circuit 182 returns a signal via the bus 191 to the communications processor 174, with said signal identifying the data block type.

The communications processor 174 provides the data block check code calculation circuit 188 with the data block, or a copy thereof, via the bus 197. The data block check code calculation circuit 188 then returns a check code via the bus 197 to the communications processor 174.

The communications processor 174 provides the data block conversion circuit 184 with the data block, or a copy thereof, via the bus 193. The data block conversion circuit 184 then returns a converted data block via the bus 193 to the communications processor 174. FIG. 7 shows an example of a common transmission data block. This is an example of a data block format which may be returned to the communications processor 174 by the data block conversion circuit 184. The converted transmission data block is stored in the RAM 178 by the communications processor 174 after it is returned by the data block conversion circuit 184.

Referring again to FIG. 6, the communications processor 174 provides the data block compression circuit 186 with the converted data block, or a copy thereof, via the bus 195. The data block compression circuit 186 then returns a compressed data block via the bus 195 to the communications processor 174. The compressed transmission data block is stored in the RAM 178 by the communications processor 174 after it is returned by the data block compression circuit 186. The data block compression circuit 186 performs a lossless data compression on the converted data block. By lossless data compression is meant that the circuit and methods used to compress the converted data block are such that when the compressed data block is decompressed, by an appropriate decompression circuit and method, that no loss of data has occurred, and the original converted data block is recovered in whole by the decompression circuit and methods.

FIG. 7 shows that the common transmission data block which is returned to the communications processor 174 by the data block conversion circuit 184 contains various fields for the transaction type, a version number for the wireless adapter and/or its program stored in the ROM, an adapter identification number, a sequence number for the transaction, a length code to show the length of the converted data block, a request code, the card number and its expiration date, the amount of the transaction, other transaction-specific information, and fields for the check code on the original data block as well as a check code on the transmission data block. The transaction type may be, for example, a VISA card authorization request, MasterCard authorization request, debit card purchase request or other such financial transaction request.

The adapter version number is placed in a field in the transmission data block so that a host computer 160 receiving the transmission data block can determine the order, position and type of the fields which follow in a particular transmission data block format, in the event that different versions of the adapter 120 (or different versions of the program stored in ROM 176) use different formats for the common transmission data blocks.

The adapter identification may be used to particularly identify which wireless adapter 120 has converted the data block to the transmission data block.

The sequence number may be a sequence number generated by the adapter 120, or it may be a copy of the sequence number provided in the original data block by the terminal 100.

The length code is used to indicate the overall length of the transmission data block. This may be needed as the transaction-specific information may require a variable-length field (e.g., there may be no transaction-specific data or there may be 76 bytes which must be transmitted).

The request code is the request that the wireless adapter 120 is actively processing. The request would normally be an authorization request for the transaction type. However, the request code may also indicate that the wireless adapter 120 has already requested an authorization and did not receive a reply and is asking for a second or more authorization attempt.

The card number, expiration date and amount fields are used to provide the relevant information for the particular transaction.

The transaction-specific information field is for information extracted from the data block and placed into this field by the data block conversion circuit 184. The data block conversion circuit may be designed to place all of the other transaction-specific information into this field, or only selected portions thereof.

The data block check code which was calculated on the original data block by the data block check code calculation circuit 188 is placed in a field in the transmission data block. This field may be used for error detection and correction.

A check code is calculated on the transmission data block by the data block conversion circuit 184 and placed into a field in the transmission data block.

The compressed data block is not shown in detail. The formats and fields for this data block are established as a function of the design of the compression circuit. Data compression circuits and methods are well known in the art, and include circuits and methods of packing of bits into binary fields to reduce the number of unused bits due to inefficient representations of data, removal of redundant data with a token or flag to indicate where the redundant data should be placed on decompression of the data and the use of dictionaries to reduce the size of items.

The program stored in the ROM 176 of the wireless adapter 120, as shown in FIG. 6, causes the communications processor 174 to prepare the compressed data block for transmission to the host computer 160 by encapsulating the compressed data block in datagrams. The communications processor 174 first encapsulates the compressed data block in a User Datagram Protocol (UDP) datagram, which is in turn encapsulated in an Internet Protocol (IP) datagram. Both the UDP and IP headers and datagram formats are well known in the art. Alternatively, CNLP may be used as the connectionless protocol. Also, the program stored in the ROM 176 of the wireless adapter 120, as shown in FIG. 6, may cause the communications processor 174 to prepare the compressed data block for transmission to the host computer 160 by issuing commands to the wireless modem 130 to set the wireless modem 130 into an operating mode wherein the wireless modem 130 performs the encapsulation steps and manages the connectionless protocol.

FIG. 8 shows the IP header and its fields. The fields of an IP header are well known in the art and are not described in detail herein. The IP header is followed in a data packet with data. The IP header and the data which follows it is called an IP datagram.

The IP datagram may contain another datagram as its data. FIG. 9 shows a UDP datagram with the UDP header and the data field. Under the control of the program stored in the ROM 176, the wireless adapter 120 encapsulates the compressed data block in a UDP datagram and places the entire UDP datagram inside an IP datagram as the data for the IP datagram. The communications processor 174 temporarily stores the encapsulated datagram information in the RAM 178.

Figure 10:
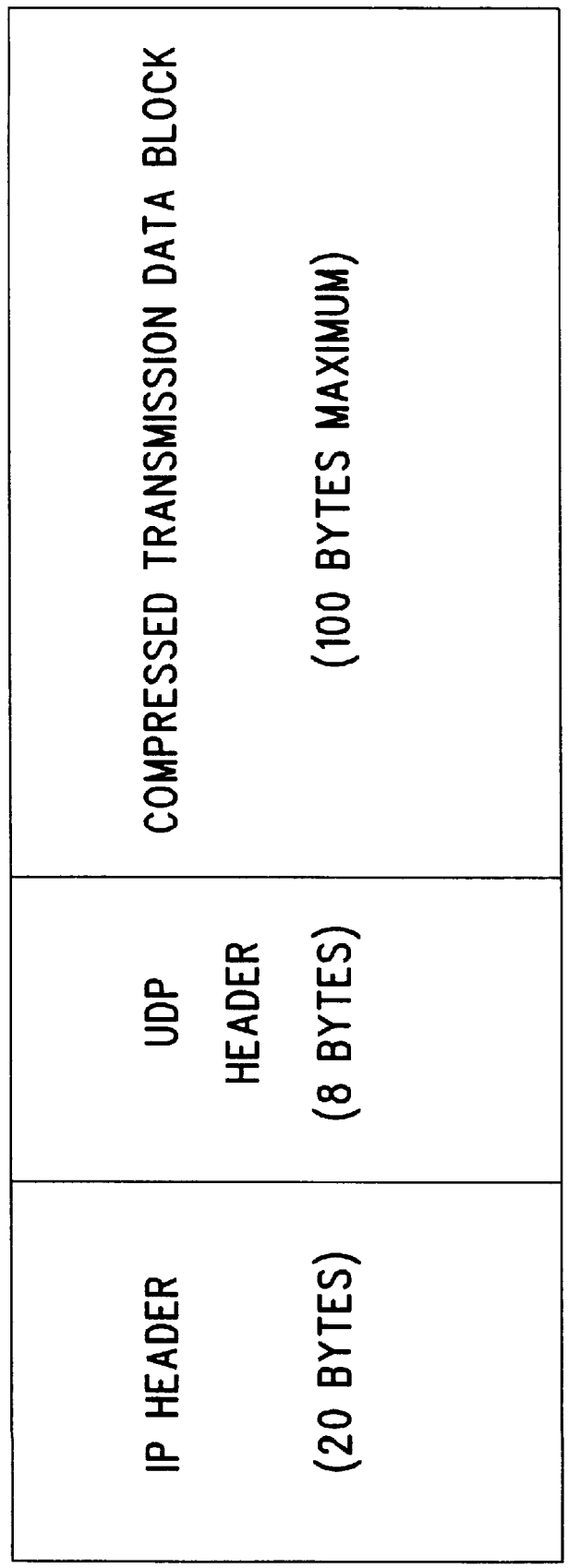
FIG. 10 shows the encapsulation of a compressed transmission data block into an IP datagram which further encapsulates a UDP datagram with the UDP header.

FIG. 10 shows the encapsulation of the compressed data block in the UDP datagram and its further encapsulation in an IP datagram. The IP header typically is 20 bytes of data, and the UDP header is typically 8 bytes of data. When the wireless adapter 120 is used with a CDPD wireless modem the data packets which are transmitted are 128 bytes in length. Thus the compressed transmission data block has a maximum size of 100 bytes in order to fit in one data packet. Since the number of bytes of the original data block is usually 90 to 238 bytes, those skilled in the art of data compression will recognize that such a compression may be readily performed without the invention of new data compression circuits or methods.

Figure 11:
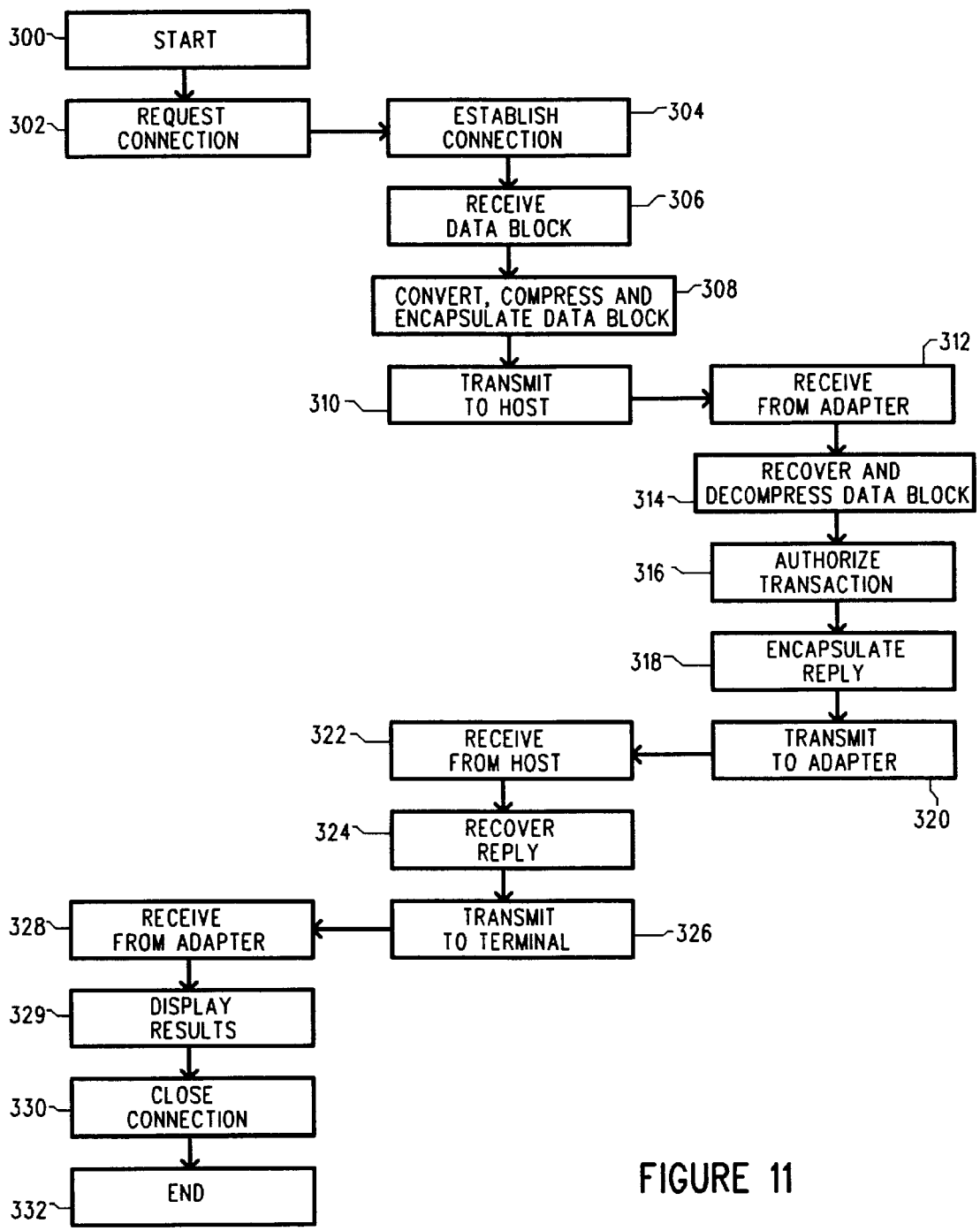
FIG. 11 shows a flow chart depicting an overview of the steps taken according to the invention to process a financial transaction.

FIG. 11 shows a flow chart depicting an overview of the actions taken when processing a financial transaction when the adapter 120 and methods of the invention are used.

The terminal 100 begins the transaction processing by requesting that a connection be made with a host computer 160. As described in relation to the conventional system and methods, this request is made by the terminal closing a relay to take the phone line connected on the phone line connector 108 off-hook, and then the terminal 100 dials a predetermined telephone number in step 302.

As shown in FIG. 11, the adapter 120 of the invention establishes the connection with the terminal in step 304. The wireless adapter 120 uses phone line interface 170 and audio frequency modem 172, shown in FIG. 6, to detect the off-hook status of the phone line connected to the terminal 100 and establish a modem connection.

Again referring to FIG. 11, the adapter 120 then receives the data block indicative of the requested financial transaction from the terminal 100 in step 306. After the adapter 120 receives the data block, the data block is prepared for transmission by the adapter 120 by converting, compressing and encapsulating the data block in step 308. The encapsulated data block is then transmitted to the host computer 160 via the first and second wireless modems, 130 and 140 respectively, in step 310.

The host computer 160 receives the encapsulated data block in step 312 and recovers the data block from the encapsulated data in step 314. The host computer 160 then authorizes (or denies) the requested financial transaction in step 316. The host computer 160 then encapsulates the reply for the requested financial transaction in step 318 and transmits the encapsulated reply to the adapter 120 via the first and second wireless modems, 130 and 140 respectively, in step 320. Host computer 160 may communicate with other computers and databases (not shown) in order to authorize or deny the requested financial transaction.

The adapter 120 receives the encapsulated reply in step 322 and recovers the reply from the encapsulated reply in step 324. The adapter 120 then transmits the reply to the terminal 100 in step 326.

The terminal 100 receives the reply in step 328, displays the result of the transaction in step 329 and closes the connection by opening its relay which was used to take its phone line connector 108 off-hook in step 330.

Figure 12:
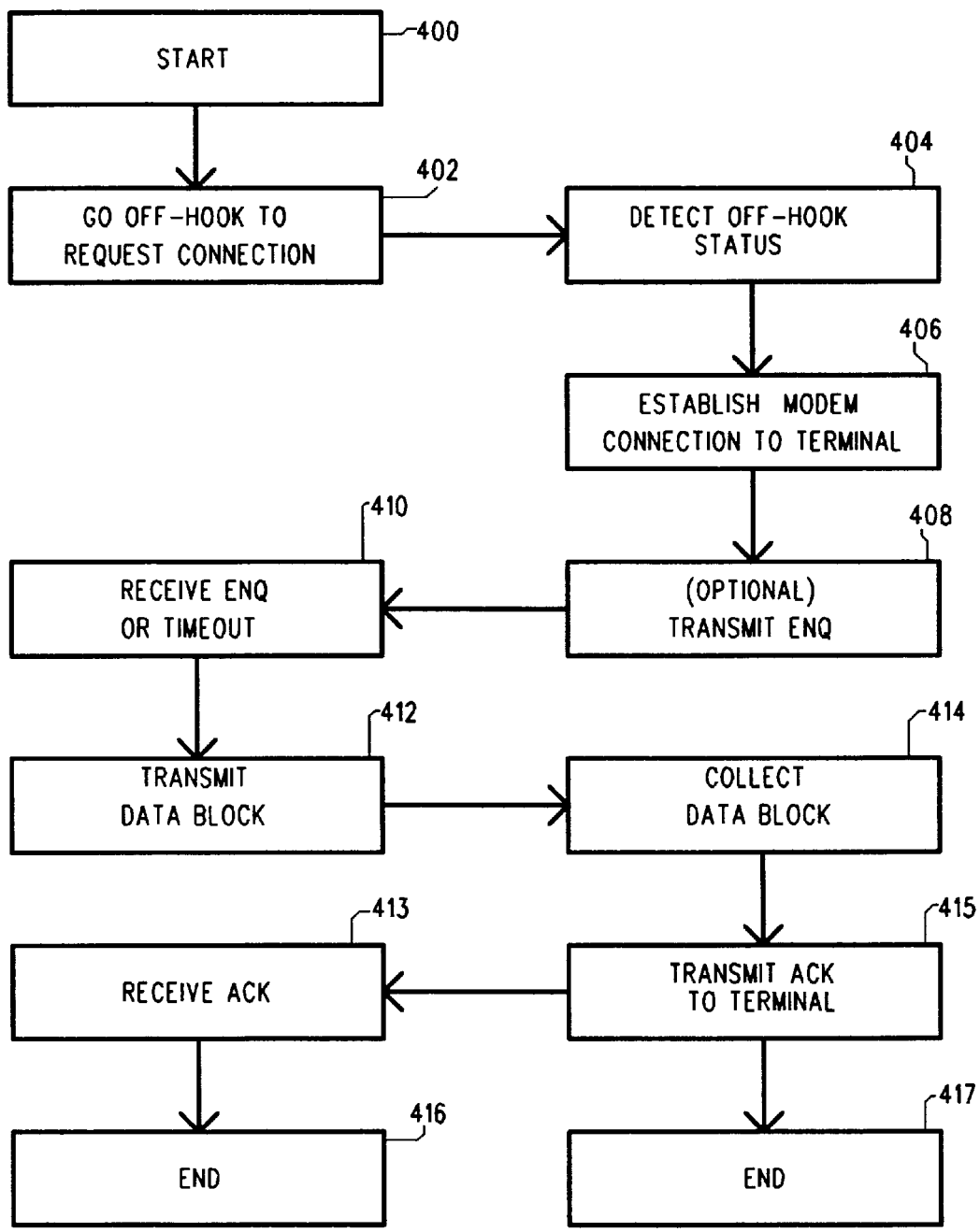
FIG. 12 shows a flow chart depicting the steps taken according to the invention to receive the data block from the terminal.

FIG. 12 shows a flow chart depicting the steps taken by the adapter 120 to receive the data block from the terminal 100 in step 306 in FIG. 11. Referring to FIG. 12, the terminal 100 goes off-hook to request a connection in step 402. The adapter 120 uses its phone line interface 170 to detect the off-hook status in step 404. The communications processor 174 of the adapter 120 instructs the audio-frequency modem 172 of the adapter 120 to establish a modem connection with the terminal 100, via the phone line interface 172 and phone line connector 122 of the adapter 120, in step 406.

After the modem connection has been established, the communications processor 174 sends an ENQ character to the terminal 100 in step 408. When the terminal 100 receives the ENQ character in step 410 it transmits the data block indicative of the requested financial transaction in step 412. Some terminals may transmit the block in step 412 once a timer in the terminal 100 times out in step 410 after the modem connection is established between the terminal 100 and the adapter 120. The communications processor 174 of the adapter 120 collects the data block via the phone line connector 122, phone line interface 170 and audio frequency modem 172 of the adapter 120 in step 414. The communications processor places the collected data block in the RAM 178. After the data block is collected by the communications processor in step 414, the communications processor transmits an ACK character to the terminal 100 in step 415. The terminal 100 receives the ACK character in step 413.

Figure 13:
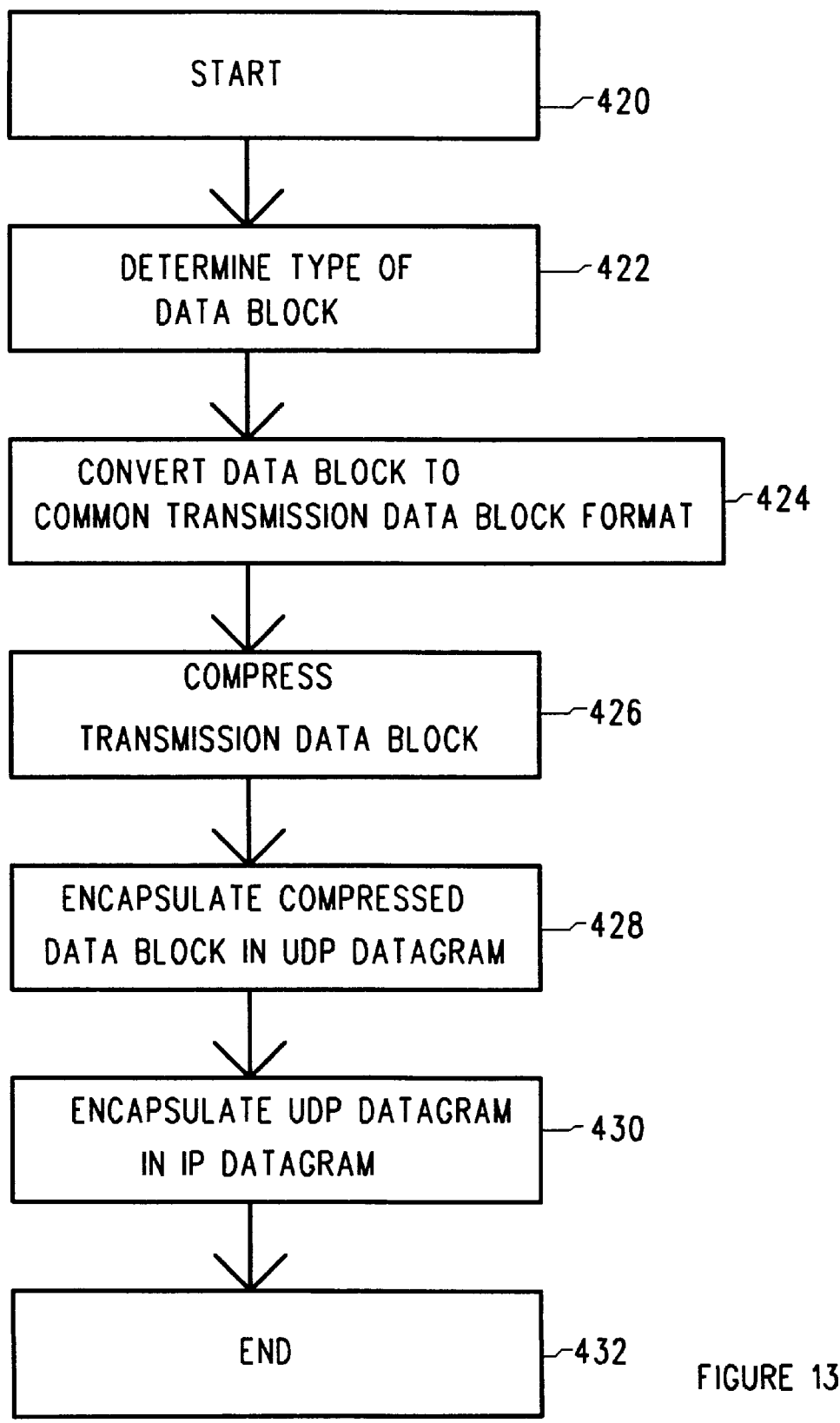
FIG. 13 shows a flow chart depicting the steps taken according to the invention to convert, compress and encapsulate the data block received from the terminal.

FIG. 13 shows a flow chart depicting the steps taken by the adapter 120 of the invention to convert, compress and encapsulate the data block in step 308 in FIG. 11. Referring to FIG. 13, the adapter 120 first determines the type of data block in step 422. Then the adapter 120 converts the data block from its original type into a common transmission data block in step 424. Each of the different types of data blocks undergoes a different transformation in the conversion of the data block from its original format to the common transmission data block format in step 424. The circuit or program which performs this transformation is tailored to each particular data block format which is supported by the adapter. However, each data block that is converted has a check code calculated on the original data block and this check code is inserted into the converted data block in step 424, so that errors in the conversion of the data block may be detected, as the check code of the converted data block would not match that computed using the same method on a recovered data block if there were conversion or transmission errors.

The converted data block is compressed by the adapter 120 in step 426. The purpose of this compression is to ensure that the converted data block can be transmitted inside a single data packet via the wireless modem. When a CDPD modem is used, the data packets have a length of 128 bytes. Thus the data block compression circuit or program should compress the converted data block to a compressed data block with a maximum length of 100 bytes, so that the IP header, the UDP header and the data block can all fit inside a single 128-byte data packet.

The adapter 120 encapsulates the compressed data block into a UDP datagram in step 428, adding the UDP header to the compressed data block and computing the UDP checksum.

The adapter 120 then further encapsulates the UDP datagram which contains the compressed data block into an IP datagram, adding the IP header to the UDP datagram and computing the values of the IP header fields in step 430.

It should be noted that some wireless modems 130 may provide support functions to perform the encapsulation of data in UDP and IP datagrams, or into another connectionless protocol. In this case the adapter 120 would perform the steps of encapsulating the compressed data block by issuing the required setup commands to the wireless modem 130 and then transmitting the compressed data block to the wireless modem 130. The wireless modem 130 would then perform the encapsulation steps, as requested by the wireless adapter 120, prior to transmission by the wireless modem 130 of the compressed data block.

The encapsulated compressed data block is transmitted to the host computer 160 via the wireless modem 130. Also well known in the art is the method of re-transmitting the IP datagram which contains a UDP datagram if no reply is received within a certain timeout period. Since this is a connectionless protocol, the wireless adapter 120 must monitor the time between the transmission of the IP datagram by the wireless modem 130 and the reply. The wireless adapter 120 contains a timer circuit 190, as shown in FIG. 6, so that this time may be monitored. If the time between the transmission of the IP datagram by the wireless modem 130 and the reply exceeds a pre-determined threshold, with no reply, then the wireless adapter 120 may re-transmit the IP datagram via the wireless modem 130.

Figure 14:
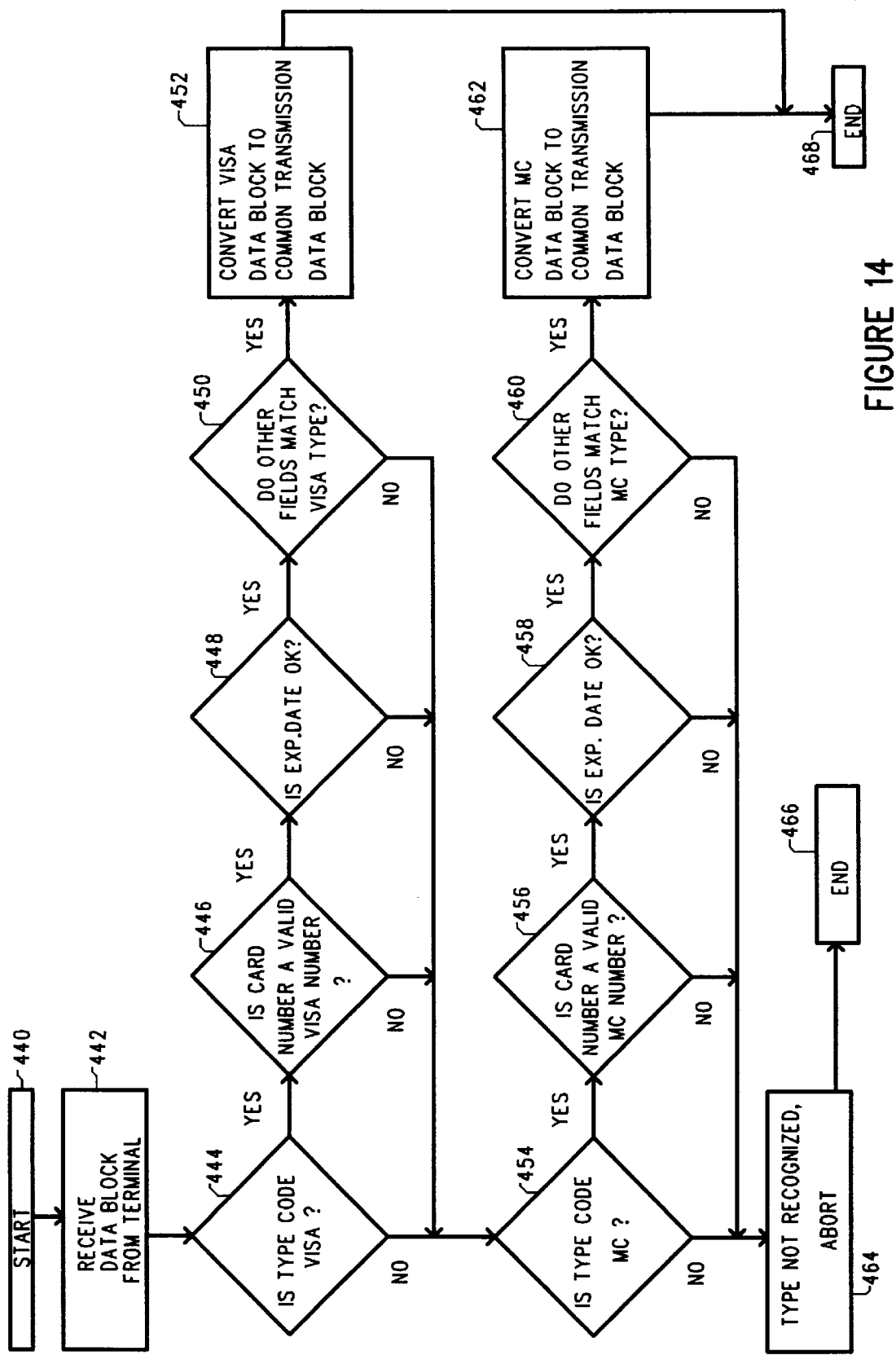
FIG. 14 shows a flow chart depicting the steps taken according to the invention to determine the data block type and generate a common transmission data block conversion.

FIG. 14 shows a flow chart depicting details of the steps taken by the adapter 120 to determine the type of the data block and perform the common transmission data block conversion in steps 422 and 424 in FIG. 13.

Referring to FIG. 14, the adapter 120 receives the data block from the terminal 100 in step 442. Then the adapter 120 performs tests on fields of the received data block in order to determine the data block type in decision steps 444 through 450 and 454 through 460. The adapter 120 checks the record type field to determine if it matches the pre-determined type code for a Visa transaction in decision step 444. If not, then the adapter goes to decision step 454 to check the record type field to determine if it matches the pre-determined code for a MasterCard transaction. If the type code check in decision step 444 was a Visa type code, the card number field is checked in decision step 446 to see if it passes rule checks for valid Visa card numbers. If the data block passes the card number test in decision step 446, then the expiration date is checked in decision step 448. The timer circuit 190 of the wireless adapter 120 may contain a portion of the timer which is a real-time clock circuit, which can be read by the communications processor 174 to obtain the current date, month and year. The expiration date is compared against the current month and year in decision step 448. If the card has not expired, then the adapter may test other fields of the data block in decision step 450 in order to further verify that the transaction is a Visa authorization request, or other type of Visa card request.

Once the data block has been determined to be a Visa transaction in decision steps 444 through 450, the adapter 120 then converts the Visa data block to the common transmission data block in step 452, using a data block conversion circuit or program tailored to the transformation of the Visa data block format into the common transmission data block format.

If the data block fails any of the Visa card tests in decision steps 444 through 450, then the adapter 120 performs another set of tests, in decision steps 454 through 460, to determine if the data block is a MasterCard (MC) data block. If these tests are passed, then the adapter 120 converts the MC data block to the common transmission data block in step 462, using a data block conversion circuit or program tailored to the transformation of the MC data block format into the common transmission data block format.

Other data block types for other types of transactions (e.g., Discover card, debit card transaction, etc.) may also be checked by the adapter 120 using similar decision steps.

If the data block does not match any of the known types of data block formats, then the type is not recognized and the adapter aborts the transaction in step 464. The communications processor 174 aborts the transaction by instructing the audio-frequency modem 172 of the adapter 120 to drop its carrier and thereby close the modem connection. The terminal 100 recognizes the loss of modem carrier and opens its relay which holds the phone line connector 108 of the terminal 100 in an off-hook state, thereby closing the connection to the terminal 100.

Figure 15:
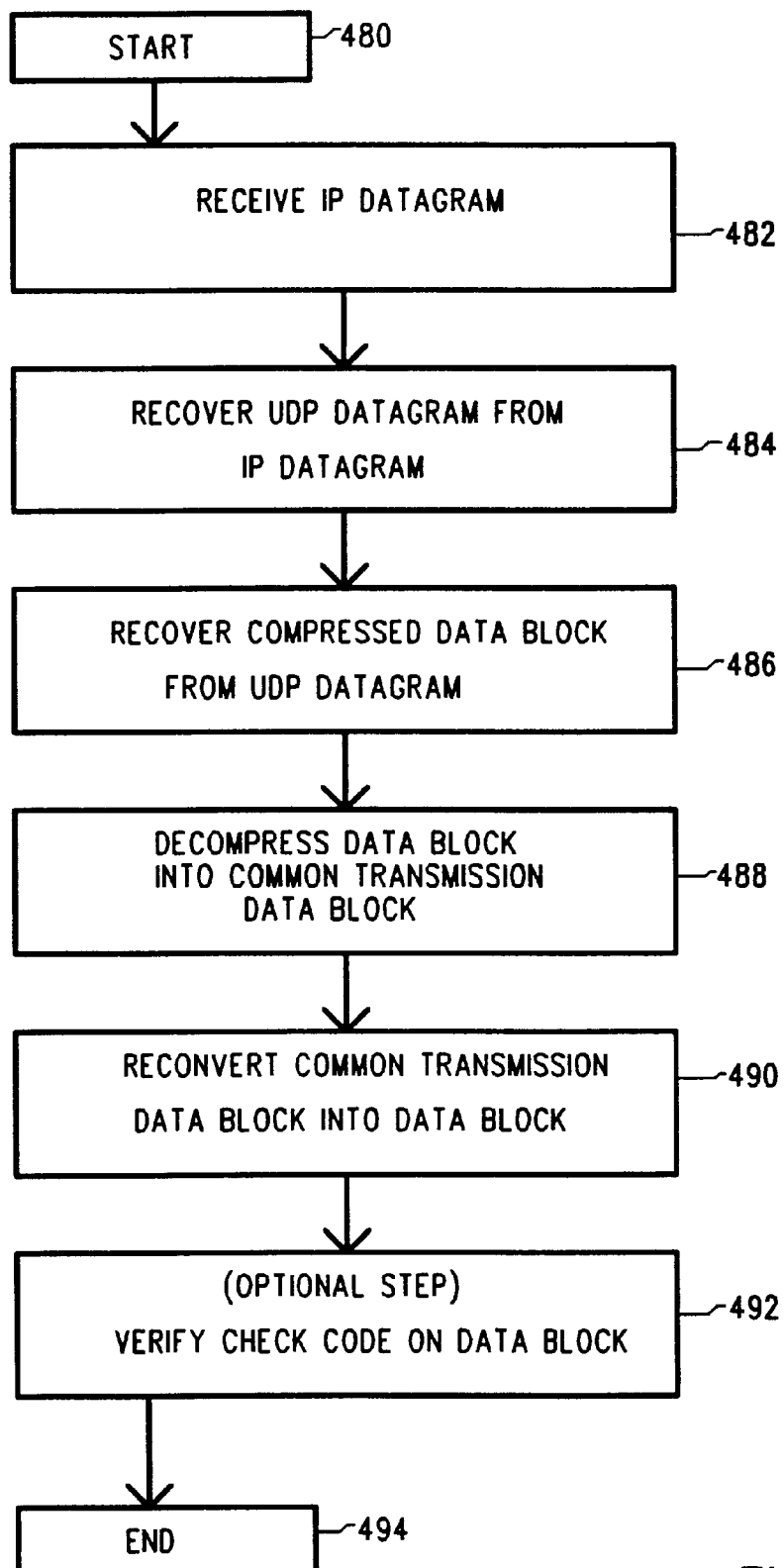
FIG. 15 shows a flow chart depicting the steps taken according to the invention to recover the data block from a received datagram.

FIG. 15 shows a flow chart depicting steps taken by the host computer 160 to recover the original data block from the received datagram in steps 312 and 314 in FIG. 11. Referring to FIG. 15, the host computer 160 first receives the IP datagram in step 482 via the second wireless modem 140 and a communications network 150. The host computer 160 then removes the IP header from the received IP datagram to recover the UDP datagram from the IP datagram in step 484. The computer then removes the UDP header from the received UDP datagram to recover the compressed data block in step 486.

Methods of receiving, interpreting and recovering data from IP and UDP datagrams are given to be well known in the art and are not shown here in detail.

The host computer 160 then decompresses the compressed data block using an algorithm compatible with the data block compression circuit 186 or program, so that the common transmission data block is recovered from the compressed data block in step 488.

The host computer 160 then uses the data in the common transmission data block to re-convert the common transmission data block into the original data block, as transmitted by the terminal 100, in step 490.

The host computer 160 may then perform an optional error detection step in step 492. The host computer 160 computes a check code on the recovered, original data block using the same circuit or method as used in the wireless adapter 120. The host computer 160 then compares the computed check code for the original data block against that contained in the common transmission data block. If the check codes match, then the original data block is determined to have been transmitted without error. If these check codes do not match, then the host computer 160 determines that an error in transmission has occurred. The host computer 160 then performs error recovery steps so that a financial transaction is not executed using an improperly transmitted data block. The use of the check code allows an optimal compression method which removes nearly all redundant information from the original data block to be used, since there is a method provided to determine if the data compression and recovery methods were, in fact, lossless.

Figure 16:
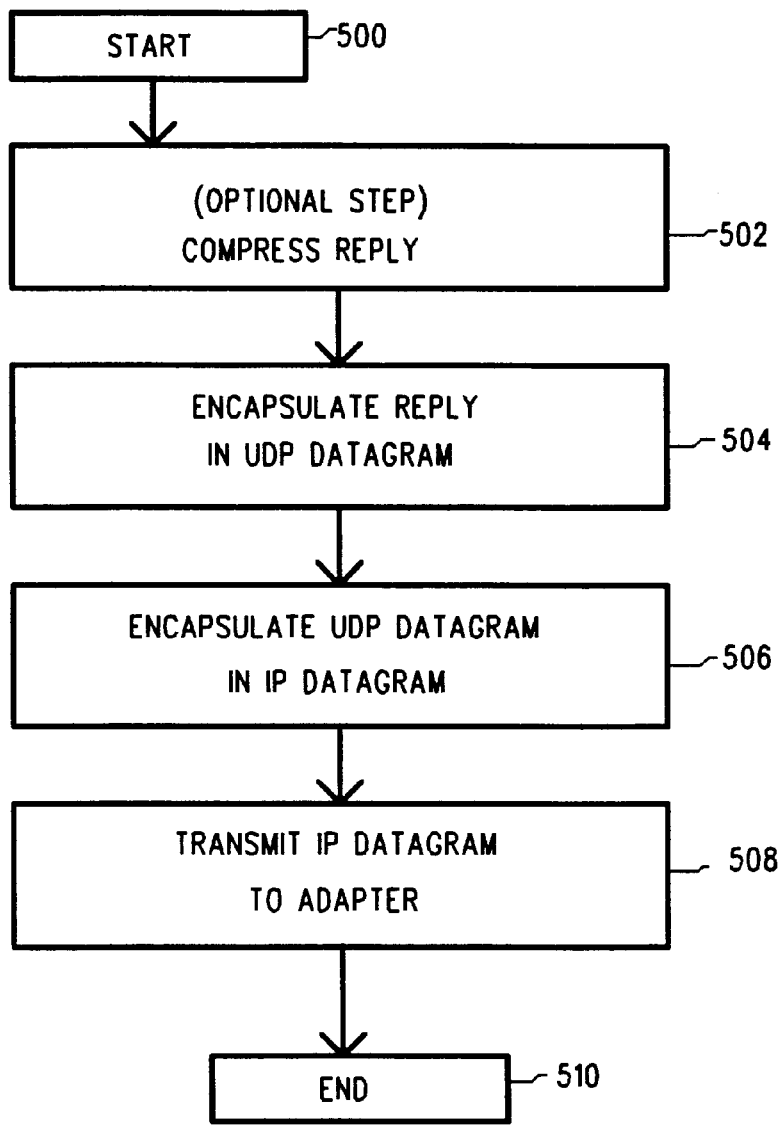
FIG. 16 shows a flow chart depicting the steps taken according to the invention to transmit a reply from the host to the adapter.

Once the host computer 160 has received the data block indicative of the requested financial transaction and authorized or denied the transaction, the host computer 160 then transmits a reply to the adapter 120. FIG. 16 shows a flow chart depicting the steps taken by the host computer 160 to transmit the reply to the adapter 100, in step 320 in FIG. 11.

The reply is transmitted to the adapter 120 in an IP datagram . Since the reply is usually a small data block, compression of the data block to fit into a single data block for the wireless modem (128 bytes) is usually not necessary. However, data compression may optionally be employed by the host computer 160, so that the IP datagram which contains the reply does not exceed 128 bytes in length. This is shown in FIG. 16 in step 502.

The host computer 160 encapsulates the reply into a UDP datagram, adding the UDP header to the reply and computing the UDP checksum in step 504.

The host computer 160 then further encapsulates the UDP datagram which contains the reply into an IP datagram, adding the IP header to the UDP datagram and computing the values of the IP header fields in step 506.

It again should be noted that some wireless modems may provide support functions to perform the encapsulation of data in UDP and IP datagrams, or into another connectionless protocol. In this case the host computer 160 would perform steps 504 and 506 of encapsulating the reply by issuing the required setup commands to the wireless modem 140 and then transmitting the reply to the wireless modem 140 via the communications network 150. The wireless modem 140 would then perform the encapsulation steps, as requested by the host computer 160, prior to transmission of the reply by the wireless modem 140.

Figure 17:
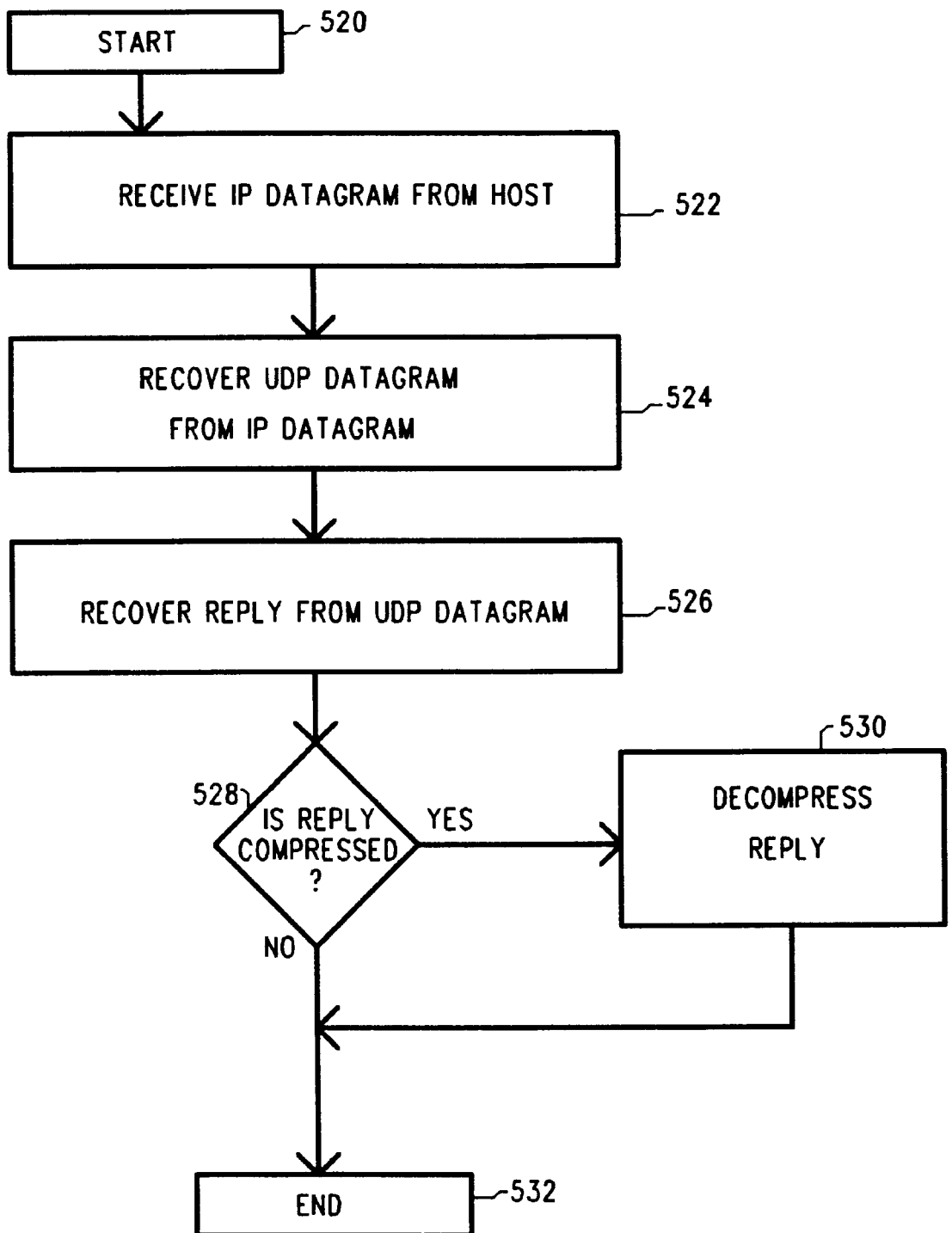
FIG. 17 shows a flow chart depicting the steps taken according to the invention to receive the reply from the host computer.

FIG. 17 shows a flow chart depicting the steps taken by the adapter 120 to receive the reply from the host computer in steps 322 and 324 in FIG. 11. Referring to FIG. 17, the adapter 120 receives the IP datagram which contains the reply from the host computer 160 in step 522, via the first wireless modem 130 and the data transmission interface 124 of the adapter 120. The adapter 120 then removes the IP header from the received IP datagram to recover the UDP datagram from the IP datagram in step 524. The adapter 120 then removes the UDP header from the received UDP datagram to recover the reply in step 526. The adapter 120 stores the received reply in the RAM 178.

Methods of receiving, interpreting and recovering data from IP and UDP datagrams are given to be well known in the art and are again not shown here in detail.

If the reply was compressed, the compressed reply needs to be decompressed. The adapter 120 checks the received reply, by checking the contents of one or more bytes of the reply, to see if the reply was compressed in decision step 528. If the reply was compressed, the compressed reply is decompressed by the adapter 120 in step 530, using either a decompression circuit or a program stored in the ROM 176 of the adapter 120 which instructs the communications processor 174 to operate on the compressed reply stored in RAM 178 so as to decompress the reply.

Figure 18:
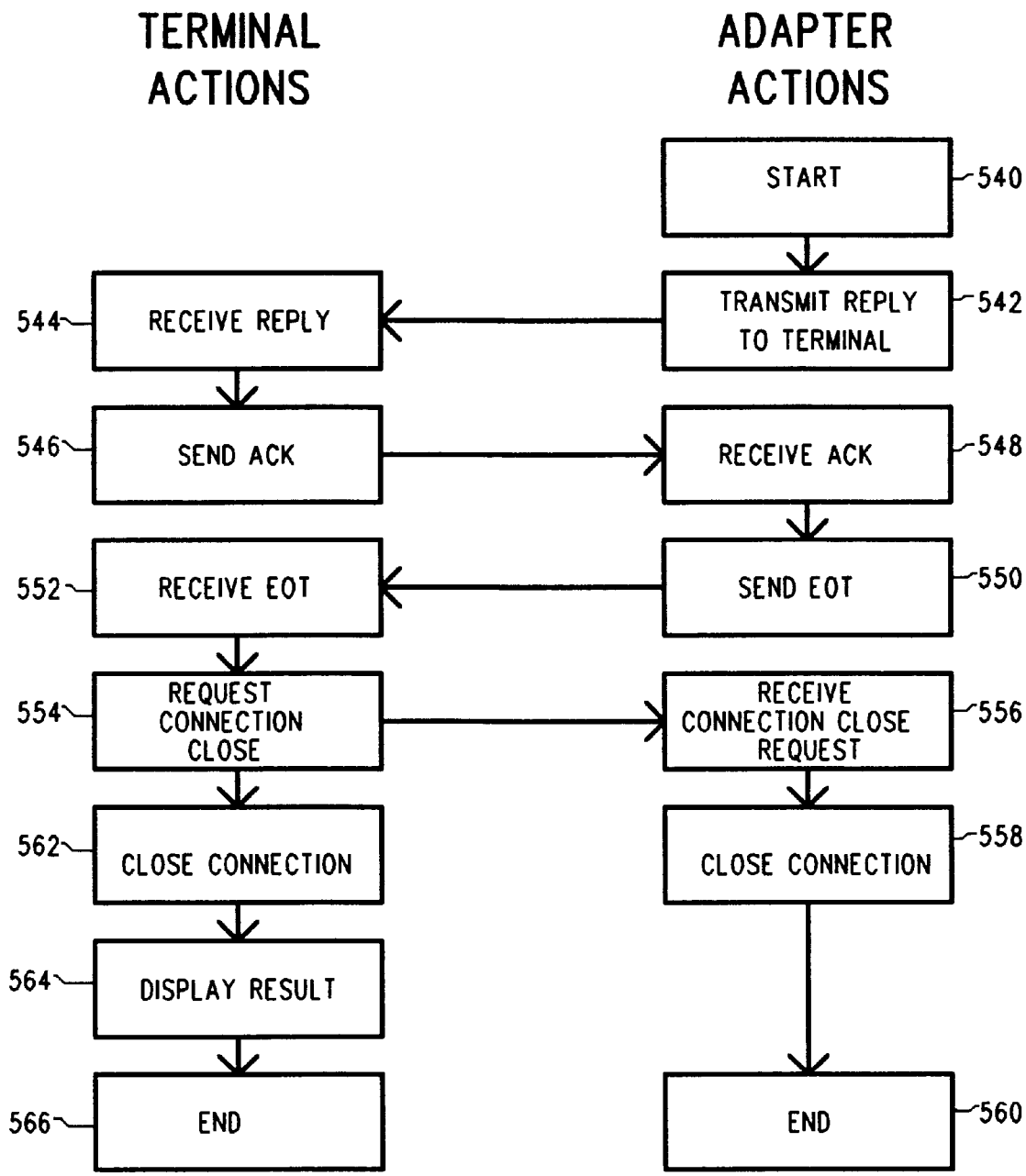
FIG. 18 shows a flow chart depicting the steps taken according to the invention to transmit the reply from the adapter to the terminal.

FIG. 18 shows a flow chart depicting the steps taken by the adapter 120 to transmit the reply to the terminal 100 and close the connection in steps 328 and 330 in FIG. 11. Referring to FIG. 18, the adapter 120 transmits the reply data block to the terminal 100 in step 542. Then the adapter 120 waits for an ACK character from the terminal 100 in step 548. If the terminal 100 did receive the reply then the terminal 100 will send an ACK character in step 546.

If the terminal 100 did not receive the reply, then the adapter 120 may re-transmit the reply to the terminal 100.

When the adapter 120 receives the ACK character in step 548, the adapter 120 sends an EOT character to the terminal 100 in step 550 to indicate the end of the processing of the financial transaction. The terminal 100 receives the EOT character in step 552 and starts to close the connection. The terminal opens its relay which was keeping the phone line connection 108 of the terminal 100 off-hook in step 554. The adapter 120, via its phone line connector 122 and phone line interface 170, detects that the terminal 100 has gone back on-hook in step 556, and the communications processor 174 instructs the audio-frequency modem 172 to drop its carrier, thereby closing the connection in step 558.

The terminal 100 then displays the result of the processed transaction in step 564.

It has been shown that the invention provides methods for optimizing financial transactions which are generated by a conventional financial transaction processing terminal when used with a wireless transmission system, by significantly reducing the number of data packets transmitted in the processing of such transactions.

It has further been shown that the invention provides these methods of optimizing financial transactions in a manner that provides transparency of operation of the terminal, so that no changes to the operation of the terminal need be made in order to use the method of the invention. The terminal does not have to be re-programmed or modified in any manner to operate with the adapter and methods of the invention.

It has also been shown that the check code used in the common transmission data block provides a method of detecting and correcting errors in the processing of financial transactions using the adapter and methods of the invention.

The individual components shown in outline or designated by blocks in the drawings are well known in the art and their specific construction and operation are not critical to the operation or best mode for carrying out the invention.

The invention has been described in reference to a particular embodiment, which is intended to be illustrative, rather than restrictive. Those skilled in the art will recognize changes or modifications which may be made to the particular described embodiment, with such changes or modifications falling under the spirit or scope of the invention, as described in the following claims.

We claim:

1. An adapter which optimizes a financial transaction processed via a wireless transmission system by reducing the number of transmitted data packets, the transaction being generated by a financial transaction processing terminal that sends a data block indicative of a requested financial transaction, said adapter comprising:
    a receiver that receives the data block indicative of a requested financial transaction from the terminal;
    an identification circuit that identifies the data block received by said receiver as one of a set of types of financial transactions;
    a conversion circuit that performs a conversion of the data block into a common transmission data block, the conversion being based on the set of types of financial transactions identified by said identification circuit, wherein all of the types of financial transactions use a common transmission data block format;
    a compression circuit that compresses the common transmission data block into a compressed data block; and
    a transmitter that transmits the compressed data block via a connectionless protocol, via the wireless transmission system.

2. The adapter of claim 1 wherein a portion of the wireless transmission system comprises the Cellular Digital Packet Data (CDPD) network.

3. The adapter of claim 1 wherein said receiver comprises a phone line connector coupled to said financial transaction processing terminal, a phone line interface and an audio-frequency modem coupled to said phone line interface.

4. The adapter of claim 1 wherein said transmitter utilizes a User Datagram Protocol (UDP).

5. The adapter of claim 1 wherein said transmitter utilizes a Connectionless Network Protocol (CNLP).

6. A method for optimizing a financial transaction processed via a wireless transmission system by reducing the number of transmitted data packets, the transaction being generated by a financial transaction processing terminal that sends a data block indicative of a requested financial transaction, said method comprising the steps of:
    receiving a data block indicative of a particular financial transaction from the conventional financial transaction processing terminal;
    identifying the data block indicative of the particular financial transaction as one of a set of types of financial transactions;
    converting the data block into a common transmission data block, said converting of the data block being based on the identified type of financial transaction, such that all of the types of financial transactions use the common transmission data block format;
    compressing the common transmission data block into a compressed transmission data block, such as to use a minimum of data transmission packets; and
    transmitting the compressed transmission data block using a connectionless protocol, via the wireless transmission system.

7. The method of claim 6 wherein said step of receiving a data block indicative of a particular financial transaction from the terminal includes the step of establishing a modem connection with the terminal with an audio-frequency modem.

8. The method of claim 6 wherein said step of transmitting the compressed transmission data block using a connectionless protocol includes the step of encapsulating the compressed transmission data block in a UDP datagram.

9. The method of claim 6 wherein said step of transmitting the compressed transmission data block using a connectionless protocol includes the step of transmitting the transmission data block using a CNLP protocol.

10. A method of error detection in a conversion and wireless transmission of a data block indicative of a particular financial transaction, said method comprising the steps of:
    receiving the data block indicative of a particular financial transaction;
    identifying the data block indicative of a particular financial transaction as one of a set of types of financial transactions;
    computing a check code on the received data block indicative of a particular financial transaction;
    converting the data block of the identified type of financial transaction into a common transmission data block, such that all of the types of financial transactions use a common transmission data block format;
    including in a field of the common transmission data block the computed check code for the received data block indicative of a particular financial transaction;
    transmitting the common transmission data block via a wireless transmission system;
    receiving the common transmission data block via a wireless transmission system;
    re-converting the common transmission data block into a recovered copy of the received data block indicative of the particular financial transaction;
    calculating a check code on the recovered copy of the received data block indicative of a particular financial transaction; and
    comparing the check code calculated on the received data block against the check code included in the field of the common transmission data block and thereby detecting an error if the check code calculated on the received data block does not match the check code included in the field.

11. The method of claim 10 wherein the check code calculated comprises a Cyclic Redundancy Check (CRC) code.

12. The method of claim 10 wherein said step of transmitting the common transmission data block includes the step of encapsulating the common transmission data block in a connectionless protocol datagram.

13. The method of claim 12 wherein the connectionless protocol datagram comprises a UDP datagram.

14. The method of claim 10 wherein said step of transmitting the common transmission data block includes the step of transmitting the common transmission data block using CNLP.

15. The method of claim 10 wherein said step of transmitting the common transmission data block further includes the step of compressing the common data block into a compressed data block, and wherein said step of receiving the common transmission data block further includes the step of expanding the compressed data block into the common data block.

16. The method of claim 15 wherein said step of transmitting the common transmission data block further includes the step of encapsulating the compressed data block in a connectionless protocol datagram.

17. The method of claim 16 wherein the connectionless protocol datagram comprises a UDP datagram.

18. The method of claim 15 wherein said step of transmitting the common transmission data block includes the step of transmitting the common transmission data block using CNLP.

* * * * *